April 7, 1953  G. B. CRANDALL  2,633,771

POWDER MEASURING DEVICE

Filed April 28, 1950

Inventor
GLADSTONE B. CRANDALL
By: Fetherstonhaugh & Co.
Att'ys

Patented Apr. 7, 1953

2,633,771

UNITED STATES PATENT OFFICE 2,633,771

POWDER MEASURING DEVICE

Gladstone Blake Crandall, Woodstock, Ontario, Canada

Application April 28, 1950, Serial No. 158,813

6 Claims. (Cl. 86—33)

This invention relates to improvements in powder measuring devices.

Heretofore devices employed for measuring powder for the loading of ammunition by sportsmen have been unnecessarily unwieldy and not consistent in accuracy without considerable care being taken in the loading operation.

A particular object of the present invention is to provide a simple small powder measuring device which may be carried in the hand and which is adaptable for accurate measurement of powder for loading purposes.

A further object of the invention is to provide a powder measuring device of this character which is adjustable to provide different loadings of predetermined volume.

With these and other objects in view, the details of the invention will be appreciated by a study of the following specification taken in conjunction with the accompanying drawings.

Figure 1:
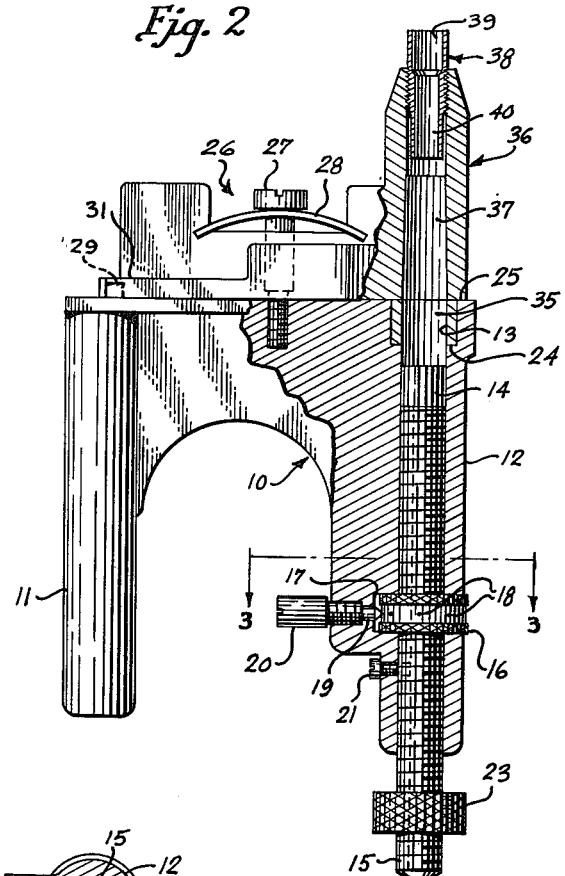
Figure 1 is a side elevation of the powder measuring device of my invention, shown partly in section.
Figure 3:
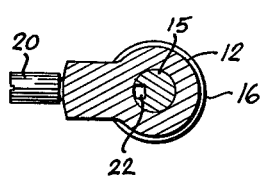
Figure 3 is a section on the line 3—3 of Figure 1.

Referring to Figure 1 in particular, it will be observed that the device of the invention comprises a cast body 10 having a handle portion 11 and a measuring portion 12 having a bore 13. A plunger 14 threaded from the lower end 15 throughout a major portion of its length slidably rides through the bore 13 in adjustment, the latter being determined by the rotation of the adjusting wheel 16 resting in the slot 17. The adjusting wheel 16 has a series of indentations 18 into which the biased stud 19, acting under spring pressure, engages. The stud 19 is slidably mounted under spring pressure within the mounting screw 20 threaded as indicated into the measuring portion 12 of the body 10. The plunger 14 is restrained against rotative movement in the bore 13 by the screw 21, the free end of which engages in the lengthwise slot 22 of the plunger. A locking nut 23 serves to fix the plunger in any one position of adjustment.

The upper end of the bore 13 incorporates a cutting liner 24 of hard steel which cooperates with the engaging surface 25 of the cutter component 26 in the powder measuring operation. The cutting component is pivoted about a pressure screw 27 which acts against the leaf spring 28 determining the engagement pressure of the cutter component of the upper surfaces of the body 10. The cutter component is free to pivot about the screw 27 in the manner indicated in Figure 2, from the normal position indicated in dotted lines to the position indicated in bold lines, the limits of travel being determined by the stud 29 in the body engaging shoulders 30 and 31 in the different positions of ultimate movement.

The cutting component comprises a charging fitting 32 in the laterally extending boss 33 having a tubular hard metal liner 34 designed to co-act with the liner 24 in cutting the proper measure of powder.

Figure 2:
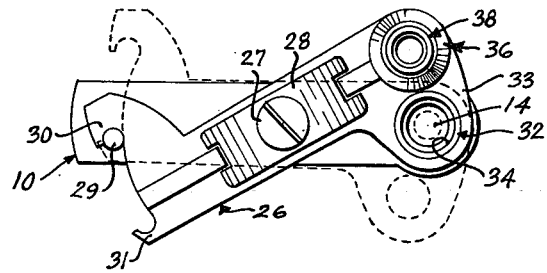
Figure 2 is a plan view of the device of Figure 1.

In operation, the components are positioned as indicated in bold lines in Figure 2 and the powder is poured through the charging fitting into the chamber 35 as defined by plunger 14 and powder measuring portion of the body. An excess of powder is poured in loosely and then the cutting component is swung to the position shown in dotted lines in Figure 2. In this operation, the liner 34 of the cutting component cuts the excess powder from the top of the chamber 35 by co-acting with the liner 24 of the bore 13. The excess powder spills free of the device and since these operations may be carried out over a powder box the excess will fall into such box.

When the cutting component is moved in this manner to the position indicated in dotted lines in Figure 2 and as illustrated in Figure 1, the loading spout 36 will be in a position for loading a bullet casing (not shown).

In construction, the loading spout incorporates a bore 37 disposed in alignment with the bore 13 when in the operative position and carries at its free end a casing receiving fitting 38 having a series of inner bores 39 and 40 to accommodate different sizes of casing ends for various small arms ammunition casings. The whole powder measuring device is merely tipped up to cause the powder retained in the chamber 35 to fall through the bore 37 into the casing held in engagement with the fitting 38. In this manner, the casing is quickly loaded with a predetermined amount of powder.

It is essential to observe that the essence of the device disclosed is embodied in the arrangement of a charging opening and an outlet fitting in the one component, that is to say, the cutting component which co-acts with a powder receiving chamber, which latter is adjustable in predetermined manner as to volume. It is thus intended that the present disclosure should not be construed in any limiting sense other than that indicated by the scope of the following claims.

What I claim as my invention is:

1. In a device for measuring powder for small arms ammunition and dispensing the powder into the ammunition casing, the combination of: a body having a powder measuring bore, a plunger including adjustment means therefor for determining volume of powder in said bore, a powder cutting component slidably mounted on said body and having a powder charging opening movable to a position in alignment with the bore of said body to allow powder to be inserted into said bore, and a powder pouring spout in said cutting component having a powder conducting bore and movable into a position providing alignment of the latter with the bore of said body, and means on the free end of said pouring spout for receiving the open end of the ammunition casing.

2. In a device for measuring powder for small arms ammunition and dispensing the powder into the ammunition casing, the combination claimed in claim 1, and a hard metal liner defining the end of the bore in said body adjacent that end of the bore of said body which is adjacent said cutting component.

3. In a device for measuring powder for small arms ammunition and dispensing the powder into the ammunition casing, the combination claimed in claim 1, in which the adjusting means for the plunger comprise thread means on said plunger, a slot in said body transversely of the axis of said bore and passing therethrough, a threaded adjusting wheel acting against the threads of said plunger and mounted slidably in said slot, means for retaining said wheel in a position of adjustment, and means for retaining said plunger against rotation during adjustment.

4. In a device for measuring powder for small arms ammunition and dispensing the powder into the ammunition casing, the combination claimed in claim 1, in which said cutting component is pivotally mounted about a pivot extending from said body, said charging fitting and said pouring spout being disposed an equal distance from said pivot.

5. In a device for measuring powder for small arms ammunition and dispensing the powder into the ammunition casing, the combination claimed in claim 1, in which the adjusting means for the plunger comprise thread means on said plunger, a slot in said body transversely of the axis of said bore and passing therethrough, a threaded adjusting wheel acting against the threads of said plunger and mounted slidably in said slot, means for retaining said wheel in a position of adjustment, and means for retaining said plunger against rotation during adjustment, said cutting component being pivotally mounted about a pivot extending from said body, said charging fitting and said pouring spout being disposed an equal distance from said pivot.

6. In a device for measuring powder for small arms ammunition and dispensing the powder into the ammunition casing, the combination claimed in claim 1, in which said cutting component is pivotally mounted about a pivot extending from said body, said charging fitting and said pouring spout being disposed an equal distance from said pivot, and stop means for determining the limits of pivotal movement of said cutting component relative to said body.

GLADSTONE BLAKE CRANDALL.

REFERENCES CITED

The following references are of record in the file of this patent:

UNITED STATES PATENTS

| Number | Name | Date |
| --- | --- | --- |
| 1,926,137 | Blashow | Sept. 12, 1933 |

FOREIGN PATENTS

| Number | Country | Date |
| --- | --- | --- |
| 15,287 | Sweden | Sept. 10, 1901 |